United States Patent

Ogle

[15] 3,645,004

[45] Feb. 29, 1972

[54] DRYING OF EFFLORESCENT MATERIAL

[72] Inventor: Christopher John Ogle, Cornwall, England

[73] Assignee: English Clays Lovering Pochin & Company Limited, Cornwall, England

[22] Filed: Aug. 25, 1969

[21] Appl. No.: 852,670

[30] Foreign Application Priority Data

Aug. 27, 1968    Great Britain......................40,972/68

[52] U.S. Cl..............................................34/9, 34/14, 23/52
[51] Int. Cl............................................................F26b 3/00
[58] Field of Search...............................34/9, 14, 70, 71, 145

[56] References Cited

UNITED STATES PATENTS

| 2,171,652 | 9/1939 | Haney | 34/70 |
| 3,222,797 | 12/1965 | Zies | 34/14 |
| 3,230,865 | 1/1966 | Hibbel et al. | 34/14 X |
| 3,262,215 | 7/1966 | Davis et al. | 34/14 X |
| 3,290,790 | 12/1966 | Daizokunii et al. | 34/9 |

Primary Examiner—Carroll B. Dority, Jr.
Attorney—Cushman, Darby & Cushman

[57]    ABSTRACT

A process for drying an efflorescent material which is in the form of a paste or slurry. The process comprises pressure filtering the paste or slurry to express water and to form a filter cake the solids content of which is at least 50 percent by weight. The filter cake is thereafter divided into small discrete particles which are contacted with air having a temperature, being less than 100° C., and a relative humidity, being less than 90 percent RH, which will not cause loss of water of crystallization from the efflorescent material.

7 Claims, 1 Drawing Figure

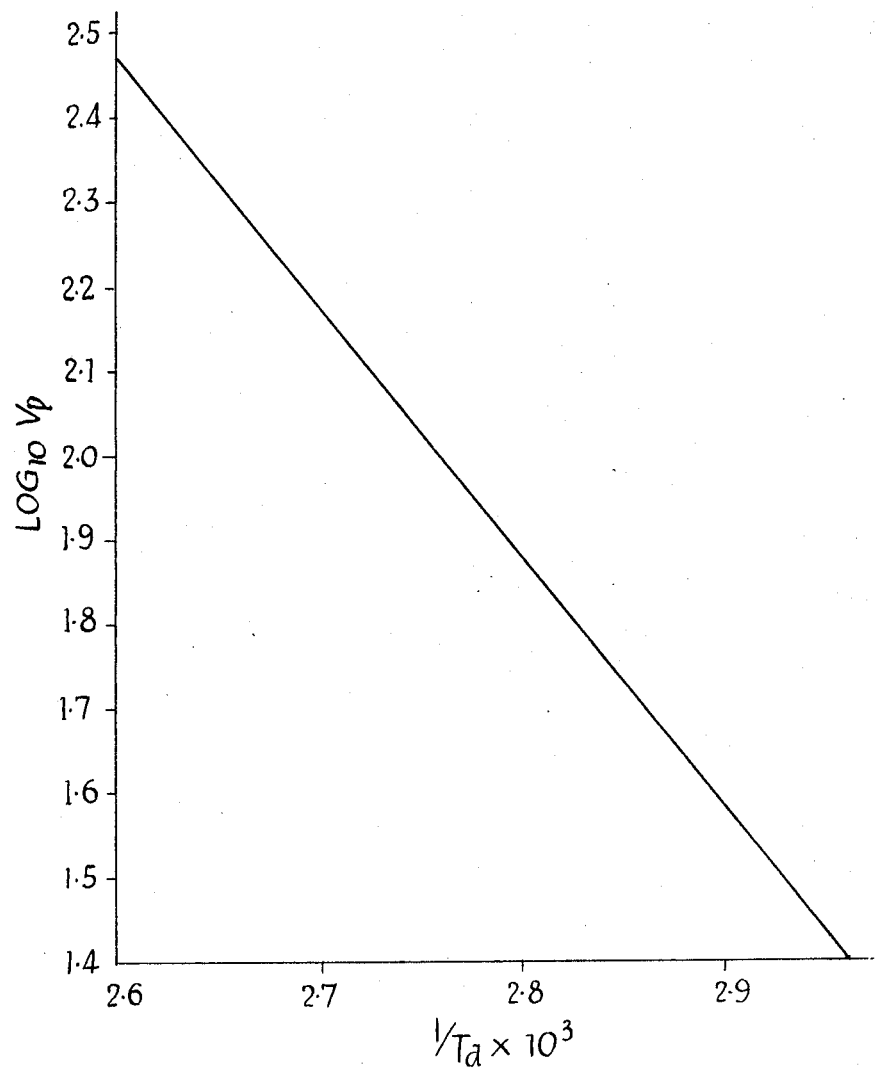

DRYING OF EFFLORESCENT MATERIAL

BACKGROUND OF THE INVENTION

This invention relates to the drying of materials and, more particularly, is concerned with the drying of efflorescent materials, for example satin white.

Satin white is a calcium sulphoaluminate and can be represented by the formula $3CaO.Al_2O_3.3CaSO_4.32H_2O$. It is used *inter alia* in paper-coating compositions as a white pigment which imparts high brightness and gloss and good printability to the coated paper. Satin white is substantially identical to the mineral ettringite and to the material which is formed on setting an expanding cement comprising a mixture of Portland cement, high alumina cement and gypsum. Satin white is conventionally prepared by interacting aluminum sulphate with slaked lime, the resulting material being stored and transported in the form of a moist paste. Thus, in one procedure for preparing satin white a concentrated aluminum sulphate solution is added to a lime paste and the materials mixed in a high-density mixer. The amount of water used in this method is such that the finished moist paste contains about 30 percent solids. In a second procedure a solution containing about 10 percent by weight of aluminum sulphate is sprayed into a slurry containing about 5 percent by weight of calcium hydroxide until the reaction is completed. The resulting slurry is then pressure-filtered to give a moist filter cake containing from 20 percent to 30 percent by weight of solids. Satin white, like other efflorescent materials, contains a large amount of water crystallization and it rapidly becomes dehydrated if it is contacted with hot dry air. For this reason, it has previously been thought to be impossible to dry satin white and other efflorescent materials.

SUMMARY OF THE INVENTION

According to the present invention there is provided a process for drying an efflorescent material which is in the form of a paste or slurry, which process comprises pressure-filtering the paste or slurry to express water and to form a filter cake the solids content of which is at least 50 percent by weight, dividing the filter cake into small discrete particles, and contacting the small discrete particles with air having a temperature, being less than 100° C., and a relative humidity, being less than 90 percent RH, which will not cause loss of water of crystallization from the efflorescent material.

DESCRIPTION OF THE PREFERRED EMBODIMENTS

The small discrete particles formed from the filter cake are advantageously of substantially uniform size. Preferably, the particles are of substantially spherical or rodlike shape, the substantially spherical particles ranging in diameter from 1/32 inch to ⅜ inch and the substantially rodlike particles ranging in cross-sectional diameter from 1/32 inch to ⅜ inch and in length from 1/16 inch to ½ inch.

The range of temperatures and relative humidities of the air which is applicable to a particular efflorescent material can be determined experimentally. For example, the temperature at which satin white begins to lose weight through loss of water of crystallization was determined in air containing a known amount of water vapor and the determination repeated for a number of different air humidities. The air was first saturated with water at a known temperature so that the dew point of the air was known and hence the relative humidity at any other temperatures could be read from tables. The decomposition temperatures corresponding to various air humidities were measured and the results obtained are shown in Table I below.

TABLE I

| Dew Point (°C.) | Decomposition temperature, $T_d$ (°C.) | Relative Humidity of air at decomposition temperature (%) |
| --- | --- | --- |
| 29 | 71 | 12.3 |
| 40 | 83 | 13.8 |
| 45 | 84 | 17.3 |
| 50 | 87 | 19.8 |
| 55 | 93 | 20.0 |
| 60 | 99 | 20.3 |
| 65 | 103 | 22.1 |
| 70 | 109 | 22.5 |
| 75 | 112 | 25.1 |

These results are shown graphically in the accompanying drawing which is a diagram in which the reciprocal of the decomposition temperature, $T_d$, in degrees absolute is plotted against the logarithm of the vapor pressure, $V_p$, of water in the air surrounding the satin white in mm of mercury. This method of plotting yields a straight line and the following numerical relationship can be deduced for the range of conditions over which the measurements were made:

$\log_{10} V_p = (-3.2 \times 10^3)/T_d + 10.8$ where $V_p$ is the vapor pressure of water in the surrounding air in mm. of mercury and $T_d$ is the decomposition temperature of the satin white in degrees absolute. By extrapolation to normal ambient temperatures it can be determined that if satin white is to be stable at 25° C. the relative humidity of the air must be at least 5 percent.

The application of the process of the invention of satin white will now be described in greater detail.

In a preferred embodiment of the present invention a slurry or paste of satin white is prepared from aluminum sulphate and lime both of which are substantially free from iron-containing impurities in order to obtain a pigment of high brightness. The slurry or paste is then subjected to a pressure-filtering process to produce a filter cake having a solids content at which it can conveniently be extruded. In general, it is desirable for the solids content of the filter cake to be extruded to be in the range 60 – 70 percent by weight of solids, and a filter cake of this solids content can be achieved either by pressure-filtering the slurry or paste at a pressure of at least 200 lb. per square inch or by pressure-filtering the slurry or paste at a lower pressure to obtain a filter cake having a solids content of about 50 percent by weight and mixing the moist filter cake with an appropriate amount of already dried material. The filter cake having a solids content in the range 60 – 70 percent by weight is then extruded, formed into small discrete particles and dried by means of a fluidized bed dryer in which the gaseous phase is air having a temperature of not more than 25° C. and a relative humidity above 12.5 percent or preferably above 30 percent. The upper limit for the relative humidity of the air is set by the lowest rate of drying which is acceptable, but in practice will not exceed 90 percent, and, generally, the relative humidity of the air will not be greater than 50 percent. The temperature of the air is preferably maintained at or near ambient temperature so as to avoid a situation in which material at an elevated temperature is transferred from an atmosphere comprising air of high relative humidity to the ambient atmosphere at a lower temperature and possibly at a relative humidity below that at which the material is stable at its initial elevated temperature. The drying may be performed either on a batch or a continuous basis.

It has been found that satin white which has been dried until all the free water has been driven off is more difficult to redisperse in water than material which still contains some free water. The material is therefore preferably dried to a solids content below 100 percent, more particularly to a solids content in the range 90 to 95 percent by weight of solids.

If the drying is to be performed on a batch basis, the filter cake having a solids content in the range 60 – 70 percent by weight is formed into small discrete particles, or pellets, by extruding the material through a nozzle having a diameter in the range 1/32 – ⅜ inch, preferably in the range 1/16 – 3/16 inch, in an apparatus separate from the fluidized bed dryer, and subdividing the extruded strings into particles not more than ½-inch long by a suitable chopping or cutting action. Alternatively, the particles, or pellets, are formed from the paste in a pin-type pelletizer such as is described in U.S. Pat. No.

2,306,698. A charge of particles of suitable weight is fed to the fluidized bed dryer vessel in which the particles are held in a fluidized condition, in an upcurrent of air at the required temperature and relative humidity, for a length of time sufficient for the particles to be dried to the desired water content.

If the drying is to be performed on a continuous basis, the apparatus used can be substantially as described in British Pat. Specification No. 901,032 in which there is disclosed a process for extruding a filter cake directly into a fluidized bed comprising pellets of the same material which are in the process of drying, mechanical stirring means optionally being provided to promote the breaking of the extruded strings into pellets. Alternatively, a pelletizing process as described in British Pat. Specification No. 942,576 can be used.

In another embodiment of the invention, the filter cake of satin white is divided into pellets, as described above, and the pellets are then dried, in a pulverizing mill, e.g., a Raymond mill or a disc or pin attrition mill, through which is blown under pressure air of the required temperature and relative humidity.

The invention is further illustrated by the following example.

EXAMPLE 9.6 kg. of iron-free aluminum sulphate, $Al_2(SO_4)_3 \cdot 14H_2O$, was dissolved in 54 liters of water and the solution added with vigorous agitation over a period of 5 minutes to a slurry comprising 7.57 kg. of calcium hydroxide in 29 liters of water. The mixture was then agitated for a further 30 minutes, the agitation being effected by a Silverson high-speed shrouded-impeller mixer. The resultant moist paste was then pressure-filtered at about 80 lb. per square inch, and the filter cake which was formed was found to comprise 50 percent by weight of solids. To the filter cake there was added satin white, which had already been dried, in the proportion 1 part by weight of already dried satin white to 2 parts by weight of filter cake, the components being thoroughly mixed in a Z-blade kneader mixer to yield a stiff paste comprising 67 by weight of solids. This stiff paste was than extruded through a ⅛-inch-diameter orifice, and the extruded strings of material were broken by hand into pellets about ¼-inch long. The pellets were placed in a fluidized bed drying vessel provided with a perforated base through which there was blown air at 25° C. temperature and 35 percent relative humidity. The pellets were removed from the fluidized bed drying vessel after a period of time which, from experience, was known to give a product having a solids content in the range 90 to 95 percent by weight of solids.

A paper-coating composition containing the dried satin white was then prepared by the following method. 10 mm. of casein, 0.25 gm. of a proprietary defoaming agent known as NOPCO KGL, 4.5 ml. of a 10 percent w/v solution of sodium hydroxide and 40 ml. of water were mixed cold and then heated with stirring to 55° C. for 15 minutes; and a further 1 ml. of 10 percent sodium hydroxide solution was then added when the mixture was cool. 275 gm. of the pelletized, dried satin white was then crushed in a jaw crusher and added to a mixture of 55 ml. of a 20 percent w/v solution of sodium polyacrylate dispersant, 27.5 ml. of a 10 percent sodium hydroxide solution and 142.5 ml. of water; and the resulting mixture was vigorously agitated with a Silverson mixer and poured through a No. 100-mesh B.S. sieve. 36.5 gm. of the second mixture i.e., that quantity which contained 20 gm. of dry satin white, were then added to the first mixture, and then a further 30 ml. of water was added to the combined mixture. A third mixture was prepared from 80 gm. of an English china clay comprising 75 percent by weight of particles smaller than 2 microns equivalent spherical diameter, 1.2 ml. of a 20 percent sodium polyacrylate dispersant, 1.5 ml. of a 10 percent sodium hydroxide solution and 32 ml. of water, the ingredients being thoroughly mixed in a high-speed mixer. 114.3 gm. of the third mixture were then added to the combined first and second mixtures containing casein and satin white. Finally, 20.8 ml. of a proprietary latex (DOW Latex 636) comprising 48 percent by weight of solids was added with stirring to form the paper-coating composition, the pH of which was 10.0.

For comparison, a second paper-coating composition containing a commercially available satin white in the form of a moist paste containing 40 percent by weight of satin white and 60 percent by weight of water was prepared as follows. 10 gm. of casein, 0.25 gm. of NOPCO KGL, 4.5 ml. of a 10 percent w/v solution of sodium hydroxide and 40 ml. of water were mixed cold and then heated with stirring to 55° C. for 15 minutes. A further 1 ml. of 10 percent sodium hydroxide solution was then added when the mixture was cool. 50 gm. of satin white paste, i.e., that quantity which contained 20 gm. of dry satin shite, was mixed by hand with 4 ml. of a 20 percent w/v solution of a sodium polyacrylate dispersant and 2 ml. of 10 percent sodium hydroxide solution. The second mixture was then added to the first mixture. A third mixture was prepared from 400 gm. of an English china clay comprising 75 percent by weight of particles smaller than 2 microns equivalent spherical diameter, 6 ml. of a 20 percent w/v solution of a sodium polyacrylate dispersant, 8 ml. of 10 percent sodium hydroxide solution and 160 ml. of water, the ingredients being thoroughly mixed in a high-speed mixer. 114.3 gm. of the third mixture, i.e., that quantity which contained 80 gm. of dry china clay, were then added to the combined first and second mixture containing casein and satin white. Finally, 20.8 ml. of Dow Latex 636 was added with stirring to form the paper-coating composition, the pH of which was 10.6.

Both the paper-coating compositions were coated on to hand sheets using a conventional drawbar method. The dried, coated sheets were tested for reflectance to light having wavelengths of 458 and 574 millimicrons, for TAPPI gloss at an angle of 75°, for K & N ink receptivity, for smoothness as measured by the microcontour ink test, and for IGT pick velocity using a low-viscosity oil. The results obtained are shown in Table II below

TABLE II

| Pigment | Dried satin white & china clay | Undried satin white & china clay |
| --- | --- | --- |
| % Reflectance to light of | | |
| 458μ (%) | 83.0 | 83.3 |
| 574μ (%) | 89.2 | 89.4 |
| TAPPI gloss at 75°, (%) | 63.1 | 65.1 |
| K & N ink receptivity, (%) | 28.5 | 24.6 |
| Microcontour ink test | 13.7 | 15.3 |
| IGT pick velocity, (ft. per min.) | 120 | 116 |
| Coating weight, (g. per sq. meter) | 41 | 43 |

It can be seen from Table II that, although the brightness and gloss of the sheets coated with the composition containing dried satin white were marginally inferior to that of the sheets coated with the composition containing undried satin white, the ink receptivity, smoothness as measured by the microcontour ink test, and pick resistance were better with the dried satin white than with the undried satin white.

I claim:

1. A process for drying satin white which is in the form of a paste or slurry, which process comprises filtering the paste or slurry under conditions of pressure and temperature sufficient to express water therefrom thereby forming a filter cake the solids content of which is at least 50 percent by weight and to retain in the satin white of said filter cake essentially all of its water of crystallization, dividing the filter cake into small discrete particles of substantially uniform size, the satin white content of which retains essentially all of its water of crystallization and contacting the small discrete particles with air having a temperature less than 100° C. and a relative humidity less than 90 percent RH so as to dry said satin white while retaining essentially all of its water of crystallization.

2. A process according to claim 1, wherein the small discrete particles are of substantially spherical shape and have a diameter ranging from 1/32 inch to ⅜ inch.

3. A process according to claim 1, wherein the small discrete particles are of substantially rodlike shape and have a cross-sectional diameter ranging from 1/32 to 3/8 inch and a length ranging from 1/16 inch to ½ inch.

4. A process according to claim 1, wherein said small discrete particles are formed into a fluidized bed and are contacted with air at a temperature not greater than 25° C. and with a relative humidity in the range of from 30 percent to 50 percent.

5. A process according to claim 1, wherein said slurry or paste of satin white is filtered at a pressure of at least 200 lb. per square inch until there is formed a filter cake having a solids content in the range 60 to 70 percent by weight.

6. A process according to claim 1, wherein said slurry or paste of satin white is filtered at a pressure less than 200 lb. per square inch until there is obtained a filter cake having a solids content of about 50 percent by weight and wherein the thus-formed filter cake is mixed with an amount of already dried satin white such that the solids content of the mixture is in the range 60 to 70 percent by weight.

7. A process according to claim 1, wherein the small discrete particles of satin white are contacted with said air until the solids content of said particles is in the range 90 to 95 percent by weight.

* * * * *